United States Patent

Fritz

[15] 3,699,272

[45] Oct. 17, 1972

[54] FILTER FOR A VIDEO AMPLIFIER

[72] Inventor: William Baird Fritz, Hershey

[73] Assignees: William Jeffrey Hudson, Jr., Hummelstown, both of, Pa.; AMP Incorporated, Harrisburg, Pa.

[22] Filed: May 12, 1971

[21] Appl. No.: 142,710

[52] U.S. Cl. ..................179/170 F, 333/79, 325/308

[51] Int. Cl. ..........................................H04b 3/58

[58] Field of Search............178/63, 70 R; 179/170 F; 333/79

[56] References Cited

UNITED STATES PATENTS

| | | | |
|---|---|---|---|
| 3,617,958 | 11/1971 | Schor | 333/79 |
| 3,622,918 | 11/1971 | Ito | 333/79 |
| 3,597,711 | 8/1971 | Buckley | 333/79 |

FOREIGN PATENTS OR APPLICATIONS

| | | | |
|---|---|---|---|
| 257,677 | 10/1963 | Australia | 179/170 F |

*Primary Examiner*—Kathleen H. Claffy
*Assistant Examiner*—Horst F. Brauner
*Attorney*—William J. Keating, Ronald D. Grefe, Gerald K. Kita, Frederick W. Raring, Jay L. Seitchhik, John R. Flanagan and Allan B. Osborne

[57] ABSTRACT

A filter for a video amplifier of the type used to amplify a signal on a transmission line which also carries power for operating said amplifier comprises a tubular semiconductive ferrite member coated with barium titanate. An inner conductive layer is provided on the ferrite and an outer conductive layer on the barium titanate. A plurality of turns of insulated wire forms a winding which is connected to the inner conductive layer at a point which is also connected to the transmission line. The other end of the winding is connected to a power transformer for the amplifier. The video input of the amplifier is connected between the filter's outer conductive coating and the power transformer. In another embodiment, the outer and inner conductive coatings are split and the filter is connected so that an effective shunting capacitance is connected across the power transformer. Alternatively, two filters of the type including tubular ferrite members, barium titanate and conductive coatings are used.

3 Claims, 7 Drawing Figures

FILTER FOR A VIDEO AMPLIFIER

BACKGROUND OF THE INVENTION

This invention relates to a filter for a video amplifier and more particularly to an economical filter for separating power and video frequencies.

Video amplifiers are extensively used in cable television systems to boost the signal at various points along the transmission line. Commonly, 60 Hertz power is carried on the same transmission line with the video signal. The 60 Hertz power is used to operate the video amplifiers. However, it is important to suppress the power frequencies at the video input terminals of the amplifier to prevent saturation of the amplifier due to the high level power signals.

The requirements for this type of video amplifier are that they be compact and that they be inexpensive since a large number of them are required. Capacitor and choke coil filters have been used to suppress the power frequencies. However, these components are bulky and, because a number of separate components are used, the cost is relatively high.

RELATED APPLICATIONS

There are certain RF filter devices that are particularly suitable for use in the amplifier circuit of the present invention. It is noted that Application Ser. No. 88,042, filed on Nov. 9, 1970, in the name of William B. Fritz and entitled Coated Ferrite RF Filters, discloses such filter constructions. The Application identified above is assigned to the assignee of the present application.

SUMMARY OF THE INVENTION

It is an important object of this invention to provide an inexpensive compact filter for an amplifier of the type used to amplify a signal on a transmission line which also carries power for operating the amplifier.

It is a further object of the present invention to suppress power frequencies which might otherwise be present at the amplifier video input terminals by a filter which includes a tubular ferrite member, a dielectric coating on the member and inner and outer conductive coatings thereon. A plurality of turns of insulated wire wound on the composite tubular member form a winding which is connected at one end to the inner conductive coating. This end is also connected to the transmission line. The other end of the winding is connected to the power transformer input terminal. The outer conductive coating of the device is connected to one of the amplifier video input terminals.

In accordance with another aspect of this invention, the outer and inner conductive coatings are split into two separate bands. The bands are connected to separate ends of the winding. The power transformer is connected between one end of the winding and one of the conductive bands to effectively shunt the power transformer with the capacitance between the outer conductive coating and the ferrite member.

In accordance with another aspect of the invention, two filters, each being of the type including a ferrite member, a dielectric coating and conductive coatings, are connected in a filter which suppresses power frequencies in the video output and which also bypasses video frequencies across the power transformer.

The foregoing and other objects, features and advantages of the invention will be better understood from the following more detailed description, appended claims, and drawings.

DESCRIPTION OF A PARTICULAR EMBODIMENT

Figure 1:
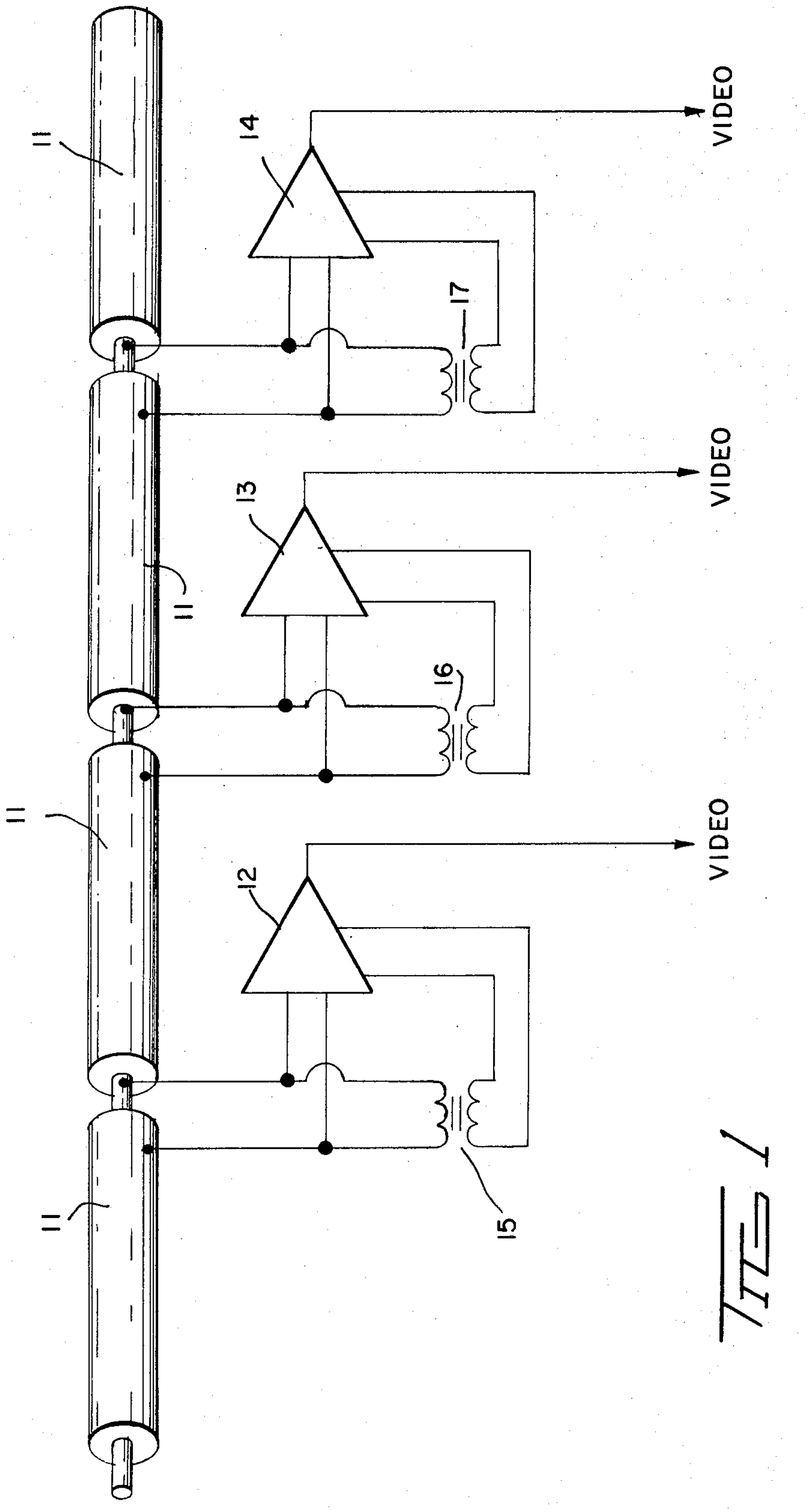
FIG. 1 shows a transmission line with a plurality of video amplifiers of the type commonly used in cable TV systems.

FIG. 1 shows a typical cable TV system in which the cable 11 carries both the video signal and the 60 Hertz power for operating a plurality of video amplifiers associated therewith. The video amplifiers 12, 13 and 14 are connected to the cable at appropriate places to boost the video signal. Power transformers 15, 16 and 17 are connected to the transmission line and are connected to supply power to the video amplifiers.

Figure 2:
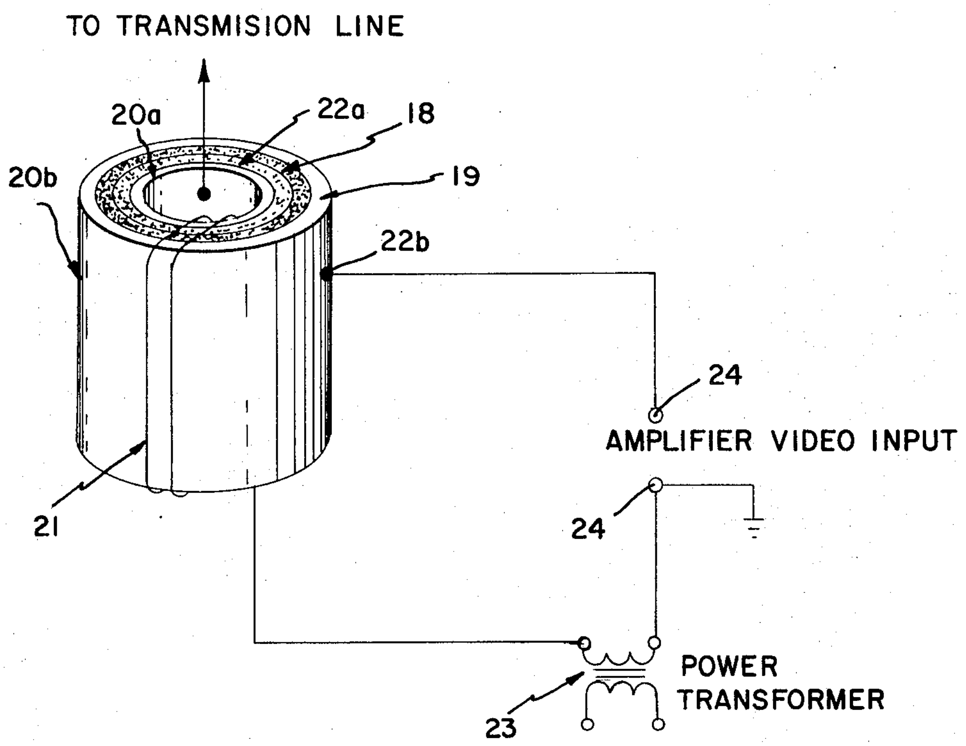
FIG. 2 shows the combination of the filter and video amplifier in accordance with this invention.

It is essential to suppress the power frequencies at the video input of the amplifier. FIG. 2 shows a compact inexpensive filter for performing this function. The filter includes a tubular ferrite member 18, coated with a layer 19 of dielectric material such as barium titanate. An inner conductive coating **20*a* deposited on the inner surface of ferrite member 18 and an outer conductive coating 20*b* covering the outer surface of the dielectric layer 19** completes the filter.

A plurality of turns of insulated wire form the winding 21. Commonly, approximately 10 turns of wire is sufficient. The insulation is stripped from the wire in a small section which is connected to the inner conductive coating **20*a*, as at point 22*a*** in FIG. 2. This end of the winding is connected to the transmission line and forms the input for the filter.

The other end of the winding is connected through the primary of power transformer 23 to the common point, indicated to be ground. The video input of the amplifier is connected to the outer conductive coating **20*b*, at point 22*b*. The video signal is developed across the amplifier input terminals 24. The 60 Hz power signal is developed across the transformer 23** which supplies power to operate the amplifier.

Figure 3:
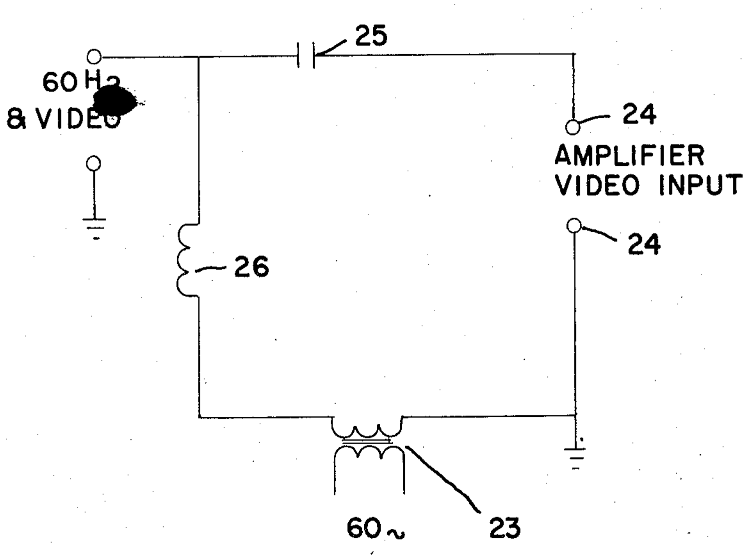
FIG. 3 shows the equivalent circuit of FIG. 2.

The equivalent circuit is shown in FIG. 3. The equivalent circuit includes the capacitance 25 between the semiconductive ferrite 18 and outer conductive member **20*b*. This is of a magnitude which effectively couples the video signal from the transmission line to the video amplifier input, which is typically 75Ω. The inductance 26 of the winding 21** forms the choke which isolates the video from the power input.

Figure 4:
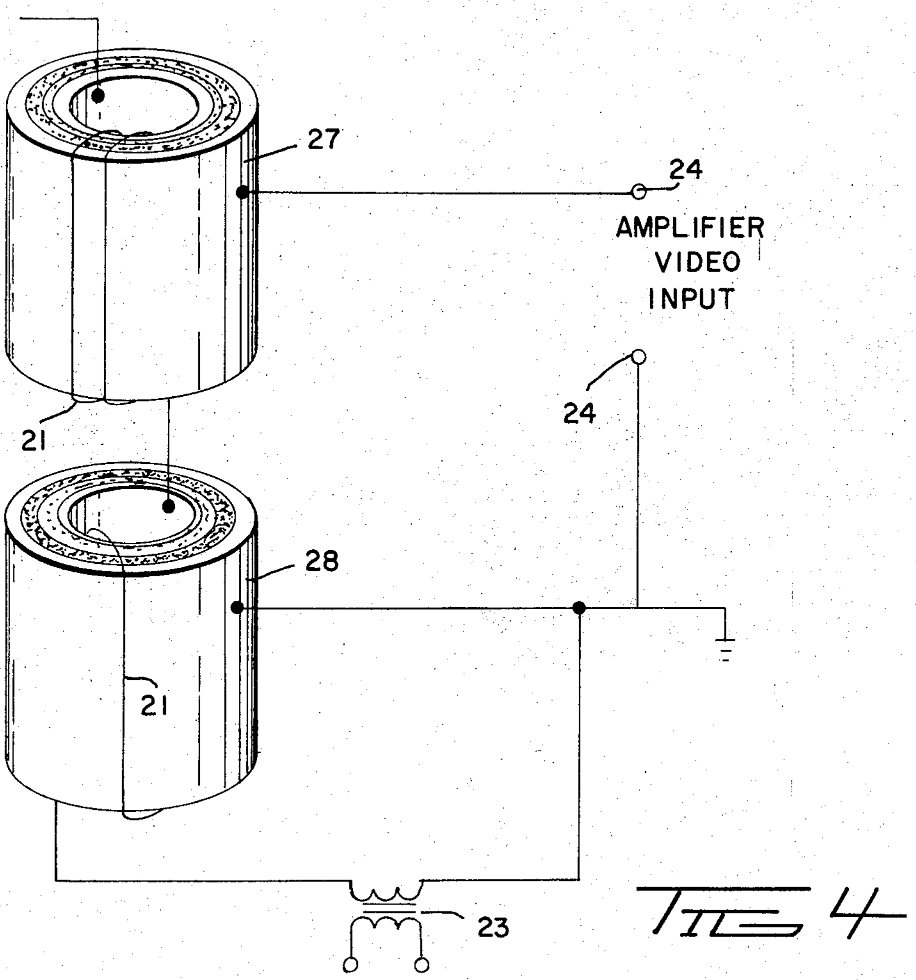
FIG. 4 shows a modification in which two lossy filters are used.

In some applications it is desirable to shunt the primary of the power transformer 23 with a capacitor to further isolate the video from the power transformer. The impedance to high frequencies, those in the video range, must be low from the common side of the video input back to the winding 21. One way of shunting the primary of the power transformer is shown in FIG. 4. This includes a first filter 27 as in the previous embodiment together with a second filter 28. The winding on the filter 28 is connected at one end to the winding on the filter 27. The other end of the winding on filter 28 is connected to the power transformer 23. The video input 24 is connected between the outer conductive coatings of filters 27 and 28. The effective capacitance between the outer conductive coating of filter 28 and the ferrite 18 forms a shunt capacitance across the power transformer 23.

Figure 5:
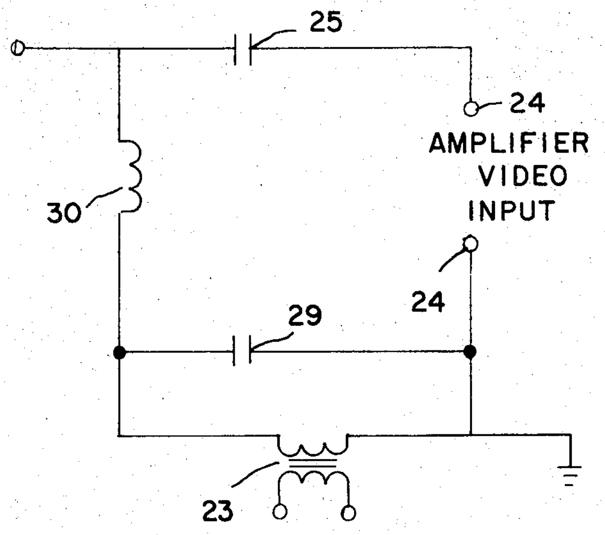
FIG. 5 shows the equivalent circuit of FIG. 4.

The equivalent circuit is shown in FIG. 5 wherein the effective capacitance of filter 28 is denoted by the reference numeral 29. The inductance 30 is the sum of the inductances of the windings on filters 27 and 28.

Figure 6:
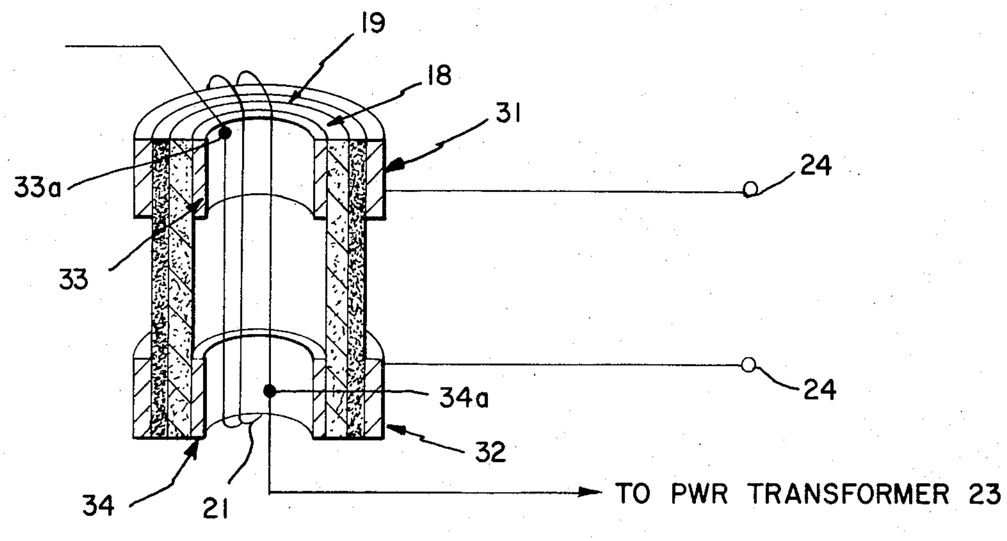
FIG. 6 shows a modification in which a filter with a split outer conductive coating is used.
Figure 7:
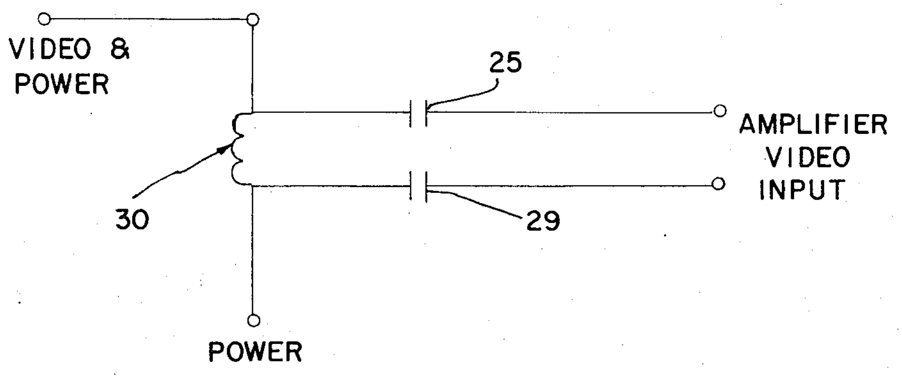
FIG. 7 shows the equivalent circuit of FIG. 6.

FIG. 6 shows a modification having the same equivalent circuit as that shown in FIG. 5 but in which a single filter device is used. In this case, gaps are made in the inner and outer conductive coatings of the filter to form separate conducting bands 31–34 as shown in the drawing. The video input 24 is connected between the outer bands 31 and 32. One end of the winding 21 is connected as shown at point 33*a* to an inner band 33 and the other end of the winding is similarly connected at point 34*a* to band 34. The effective capacitance between bands 32 and 34 forms a shunt capacitor for the power transformer 23.

The typical filter for use in accordance with this invention is 0.1 inches in diameter by 0.3 inches long and has a capacity of 5,000 micro-farads. Ten turns of No. 26 wire provide an inductive reactance of 1,000 ohms at 5 MHz. As the video frequency increases, fewer turns can be used. A filter such as this is suitable for use for supplying up to 0.2 amps of operating current through the power transformer to the amplifier. At higher currents the reactance of the coil changes too much and some of the video is modulated with 60 Hertz power. To handle higher power currents larger units providing more ferrite material are required. The impedance of the inductance must be much greater than the amplifier input impedance at maximum power current so that the RF is not modulated with the power current.

The lossy filter used in accordance with this invention replaces an inductance and two capacitors. The cost of this component is approximately the same as the cost of one capacitor.

Further modifications of the invention will be apparent. These modifications are, therefore, intended to be covered by the appended claims.

What is claimed is:

1. A filter device to be used in combination with an amplifier of the type used to amplify a signal on a transmission line which also carries power for operating said amplifier comprising: a composite tubular filter member including a tubular semiconductive ferrite element, a dielectric coating on said ferrite element, an inner conductive coating within said ferrite element, and an outer conductive coating over said dielectric coating; winding means of insulated wire wound upon said composite tubular filter member, said winding means being electrically connected to said inner conductive coating at one end of the winding means to which said transmission line is also connected; an amplifier video input means connected to said outer conductive coating; and a power transformer having its primary winding connected to the other end of said winding means and supplying power to said amplifier.

2. A filter device as recited in claim 1 wherein each of said inner and outer conductive coatings is separated by a gap into two conductive bands, said amplifier video input means being connected between the two outer conductive bands, said power transformer being connected between one end of said winding means and one of said outer conductive bands to effectively shunt said power transformer with the capacitance between said one outer conductive band and said one end of said winding means.

3. A filter device as recited in claim 1 which further comprises: a second composite tubular filter member also including a tubular semiconductive ferrite element, a dielectric coating on the ferrite element, an inner conductive coating within the ferrite element, and an outer conductive coating over said dielectric coating; a second winding means wound on said second composite tubular member and electrically connected at one end thereof to the said other end of the first winding means, said second winding means being connected at its opposite end to said power transformer; and said amplifier video input means being connected between the two outer conductive coatings of the two composite filter members, with the effective capacitance between the inner and outer conductive coatings of said second composite tubular filter member forming a shunt capacitance across said power transformer.

* * * * *

PO-1050
(5/69)

UNITED STATES PATENT OFFICE
CERTIFICATE OF CORRECTION

Patent No. 3,699,272 Dated October 17, 1972

Inventor(s) WILLIAM BAIRD FRITZ and WILLIAM JEFFREY HUDSON, JR.

It is certified that error appears in the above-identified patent and that said Letters Patent are hereby corrected as shown below:

On the title page, the heading is incorrectly stated and should read as follows:

Inventors: William Baird Fritz, Hershey; William Jeffrey Hudson, Jr., Hummelstown, both of Pa.

Assignee: AMP Incorporated, Harrisburg, Pa.

Signed and sealed this 13th day of March 1973.

(SEAL)
Attest:

EDWARD M.FLETCHER,JR.
Attesting Officer

ROBERT GOTTSCHALK
Commissioner of Patents

AMP 2884